United States Patent [19]
Peterson et al.

[11] Patent Number: 5,050,668
[45] Date of Patent: Sep. 24, 1991

[54] STRESS RELIEF FOR AN ANNULAR RECUPERATOR

[75] Inventors: Brian G. Peterson, Redondo Beach; Robert P. Urciuoli, Hermosa Beach; David G. Bridgnell, Rolling Hills, all of Calif.

[73] Assignee: Allied-Signal Inc., Morris Township, Morris County, N.J.

[21] Appl. No.: 575,038

[22] Filed: Aug. 29, 1990

Related U.S. Application Data

[63] Continuation-in-part of Ser. No. 405,366, Sep. 11, 1989, Pat. No. 4,993,223.

[51] Int. Cl.$^5$ .............................. F28F 7/00; F28D 9/00
[52] U.S. Cl. ........................................ 165/81; 165/166
[58] Field of Search ................... 165/81, 166, 167; 60/39.511

[56] References Cited

U.S. PATENT DOCUMENTS

| | | | |
|---|---|---|---|
| 3,228,464 | 1/1966 | Stein et al. | 165/166 |
| 3,285,326 | 11/1966 | Wosika | 165/166 |
| 3,322,189 | 5/1967 | Topouzian | 60/39.511 |
| 3,424,240 | 1/1969 | Stein et al. | 165/166 |
| 3,785,435 | 1/1974 | Stein et al. | 165/166 |
| 3,818,984 | 6/1974 | Nakamura et al. | 165/166 |
| 3,831,374 | 8/1974 | Nioita | 165/166 |
| 4,229,868 | 10/1980 | Kretzinger | 165/166 X |
| 4,246,959 | 1/1981 | Byrne | 165/83 |
| 4,263,964 | 4/1981 | Masai et al. | 165/67 |
| 4,291,752 | 9/1981 | Bridgnell | 165/81 |
| 4,291,754 | 9/1981 | Morse et al. | 165/165 |
| 4,331,352 | 5/1982 | Graves | 285/226 |
| 4,377,025 | 2/1983 | Masai et al. | 29/434 |
| 4,427,461 | 1/1984 | Kindlimann | 148/16.6 |
| 4,431,050 | 2/1984 | Martin | 165/166 |
| 4,458,866 | 7/1984 | Graves | 248/65 |
| 4,470,454 | 9/1984 | Laughlin et al. | 165/166 |
| 4,506,502 | 3/1985 | Shapiro | 60/39.511 |
| 4,511,106 | 4/1985 | Graves | 248/65 |
| 4,917,181 | 4/1990 | Kiernan et al. | 165/166 |

FOREIGN PATENT DOCUMENTS 460831 10/1968 China .
0077656 4/1983 European Pat. Off. .
2207266 6/1974 France .

Primary Examiner—Allen J. Flanigan
Attorney, Agent, or Firm—David B. Abel; Terry L. Miller; Robert A. Walsh

[57] ABSTRACT

An annular recuperator for use with a gas turbine engine including radial outflow passageways for the exhaust gases from the turbine engine in heat transfer relationship with enclosed passageways for air being delivered to the combustor of the turbine engine. The annular recuperator includes stress relief features to prevent thermal cycling fatigue failures of the annular recuperator.

10 Claims, 6 Drawing Sheets

STRESS RELIEF FOR AN ANNULAR RECUPERATOR

The invention was made with United States Government support under contract number DAAE07-89C-R057, awarded by the Department of the Army. The U.S. Government has certain rights in this continuation-in-part application.

This is a continuation-in-part application of U.S. patent application Ser. No. 07/405,366, filed Sept. 11, 1989, now U.S. Pat. No. 4,993,223.

BACKGROUND OF THE INVENTION

The present invention relates to a type of heat exchanger known as a recuperator. Recuperators are used in conjunction with various power generating devices to increase the operating efficiency of the system. In general, a recuperator pre-heats air prior to combustion within a gas turbine engine in heat exchange relationship with the hot exhaust gases. The present invention is more specifically directed to an annular recuperator for use with a gas turbine engine.

Recuperators are specifically designed and required to operate in extreme environments. The hot pass side of the recuperator is subjected to pressurized combustion exhaust gases and temperatures in excess of 1000° F. Meanwhile, the cold pass side of the recuperator receives ambient or precompressed ambient air at temperatures which may be below 0° F. The potentially destructive combination of high pressure differentials, high thermal differentials, and corrosive combustion products is amplified by thermal cycling and startup/shutdown cycles. Thus, the recuperator must be extremely rugged, while being flexible to accommodate thermal growth and cycling.

A number of the problems associated with the design and construction of industrial flat-plate type recuperators are addressed within U.S. Pat. Nos.: 4,246,959; 4,263,964; 4,291,752; 4,291,754; 4,299,868; 4,331,352; 4,377,025; 4,458,866; and 4,511,106 all of which are currently assigned to the assignee of the present invention.

While a properly designed recuperator increases the efficiency of the power generating system, there are disadvantages associated with their use. Notably, the recuperator back pressurizes the power plant, decreasing its efficiency. Also, recuperators add substantial weight and size, and they are potentially subject to failure, causing downtime for the power generating system. For mobile applications, such as within ships and land vehicles, the added weight and size considerations become extremely important, and may determine whether the added efficiency of the system is justified.

SUMMARY OF THE INVENTION

The present invention provides an annular recuperator constructed from a plurality of generally circular plates having formed edges, and heat transfer fins placed in passageways between the circular plates. Alternate air and gas flow passages are separated by the plates when the plates and heat transfer fins are assembled and brazed. Each of the plates includes a plurality of spaced apart, generally triangular holes which align to form air inlet and outlet manifolds axially aligned within the recuperator core. The air flows axially into the recuperator core through the generally triangular inlet manifolds. The inlet manifolds distribute the air to a plurality of air flow passageways, which include generally Z-shaped heat exchange fins which direct the air flow to adjacent outlet manifolds. The now heated air then flows axially through the outlet manifolds and out of the recuperator core. Meanwhile, hot combustion gases from the turbine engine are distributed within a cylindrical volume inside the annular recuperator. The combustion gases flow radially outward through a plurality of gas passageways within the core. The gas passageways are bounded by successive air inlet and outlet manifolds and by adjacent plates. Thereby, the gas passageways are configured to have approximately constant cross-sectional areas. Each of the plates further includes a plurality of voids, disposed radially inward of the air inlet passageways. The voids also communicate with the cylindrical volume inside the annular recuperator, thereby the inner diameter of the recuperator is discontinuous as opposed to being a continuous circumference. This discontinuity of the inner diameter results in a substantial thermal stress reduction during operation over prior annular recuperator designs.

The annular recuperator is designed for high heat transfer efficiency. Heat is transferred from the hot exhaust to the colder compressor air through the use of offset fins. These offset fins conduct heat efficiently with minimum pressure loss. The annular recuperator assembly thereby provides engine performance benefits primarily as a reduction in fuel consumption. These improvements in overall engine performance are provided by the annular recuperator heat transfer effectiveness, while the weight and pressure drop across the recuperator are minimized, and the thermal stresses are substantially reduced.

DETAILED DESCRIPTION OF THE PREFERRED EMBODIMENT

Figure 1:
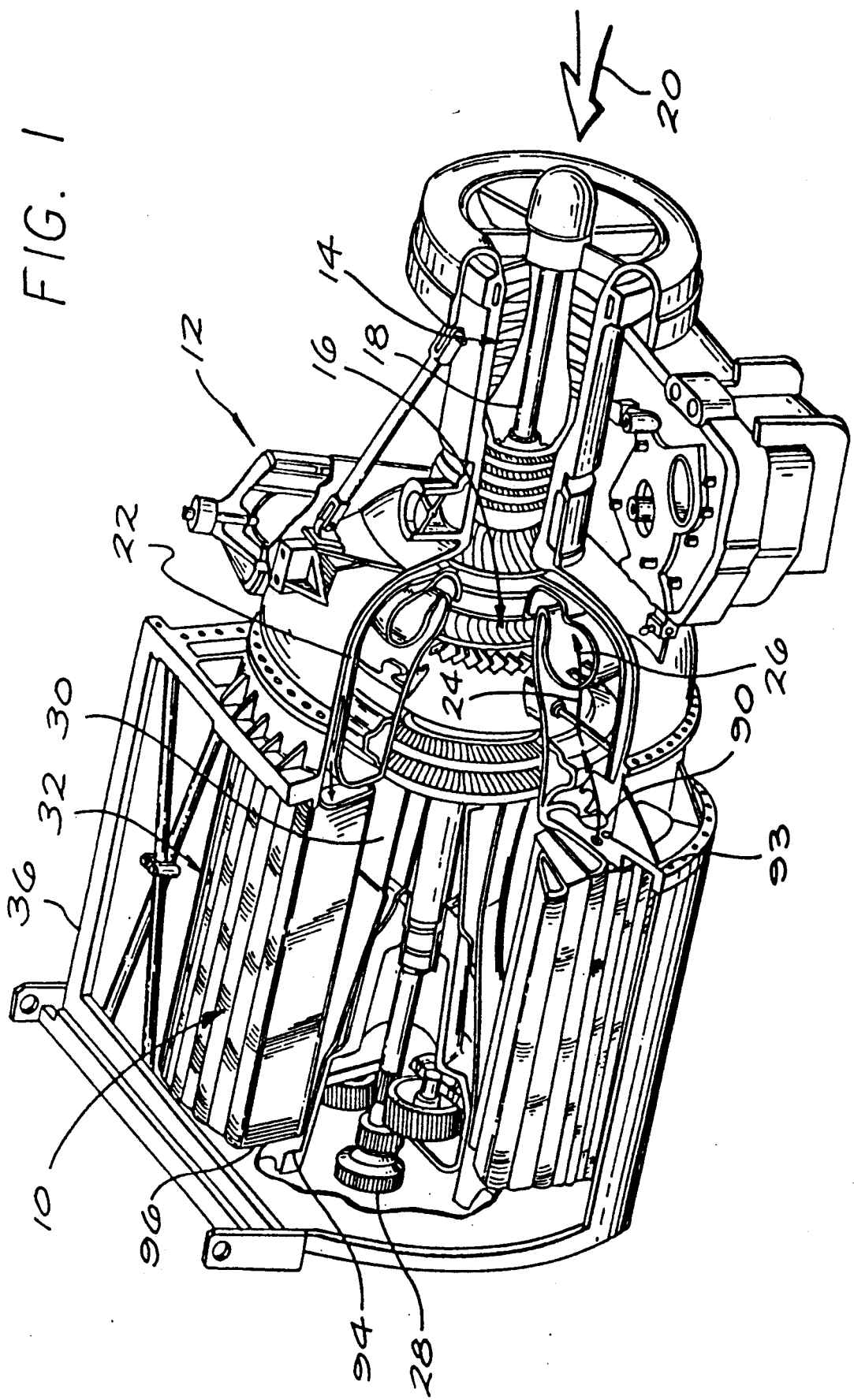
FIG. 1 shows a schematic, partially cutaway view of an annular recuperator attached to a gas turbine engine.

FIG. 1 schematically depicts a cutaway view of an annular recuperator 10 attached to a gas turbine engine 12. The engine 12 includes a multistage compressor section 14 rotatably driven by a multistage turbine section 16 via shaft 18. Ambient air is drawn into the compressor section 14 as depicted by arrow 20. Compressed air exiting the compressor section 14 is conducted via duct 22 to the annular recuperator 10, wherein it is heated by the engine exhaust gases. The heated, compressed air from the annular recuperator 10 is then conducted via duct 24 to a combustor 26 of the turbine engine 12. Within the combustor 26, the heated, compressed air is mixed with fuel from a fuel tank (not shown) and combusted, producing hot motive combustion gases. These hot gases are directed upon the turbine section 16 of the engine 12 producing rotational output power via the shaft 18. A small portion of this output power is required to drive the compressor section 14, while the majority of the output power is used for driving the output shaft. The driving output shaft power may be used to drive a generator, compressor, propeller or vehicle (not shown) through gear box 28. The exhaust gases exiting the turbine section 16 enter an annular chamber 30 within the interior of the annular core 32 of the recuperator 10. Therein, the exhaust gases are distributed to a plurality of radially extending exhaust gas passageways 34, described in more detail below, within the annular core 32. After exiting the annular core 32, the exhaust gases are conducted through exhaust gas manifold 36, and an exhaust conduit (not shown) to the atmosphere.

Figure 2:
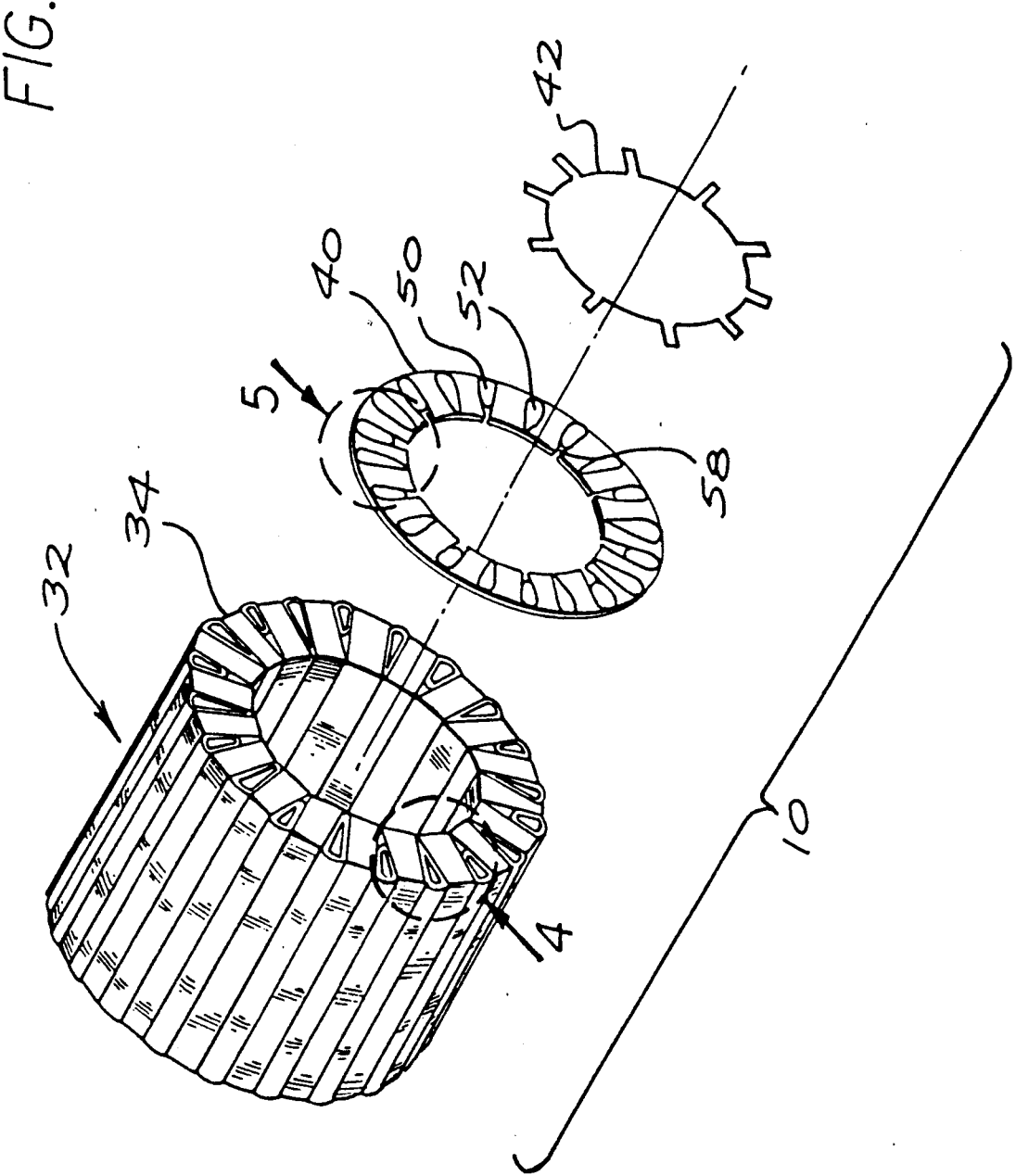
FIG. 2 shows a perspective, partially exploded view of the recuperator core.
Figure 3:
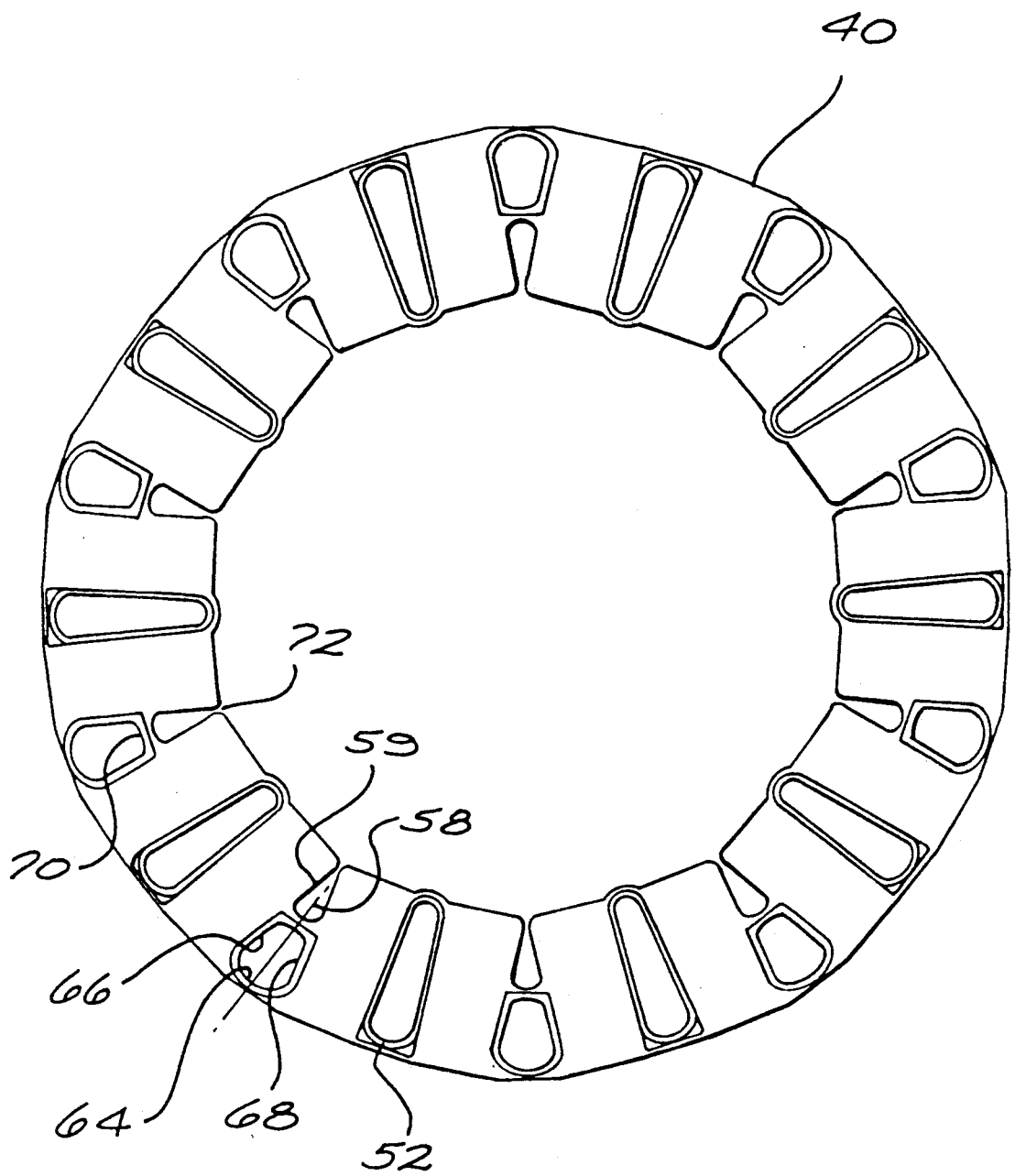
FIG. 3 shows a plan view of a plate incorporated into the recuperator core of FIG. 2.
Figure 4:
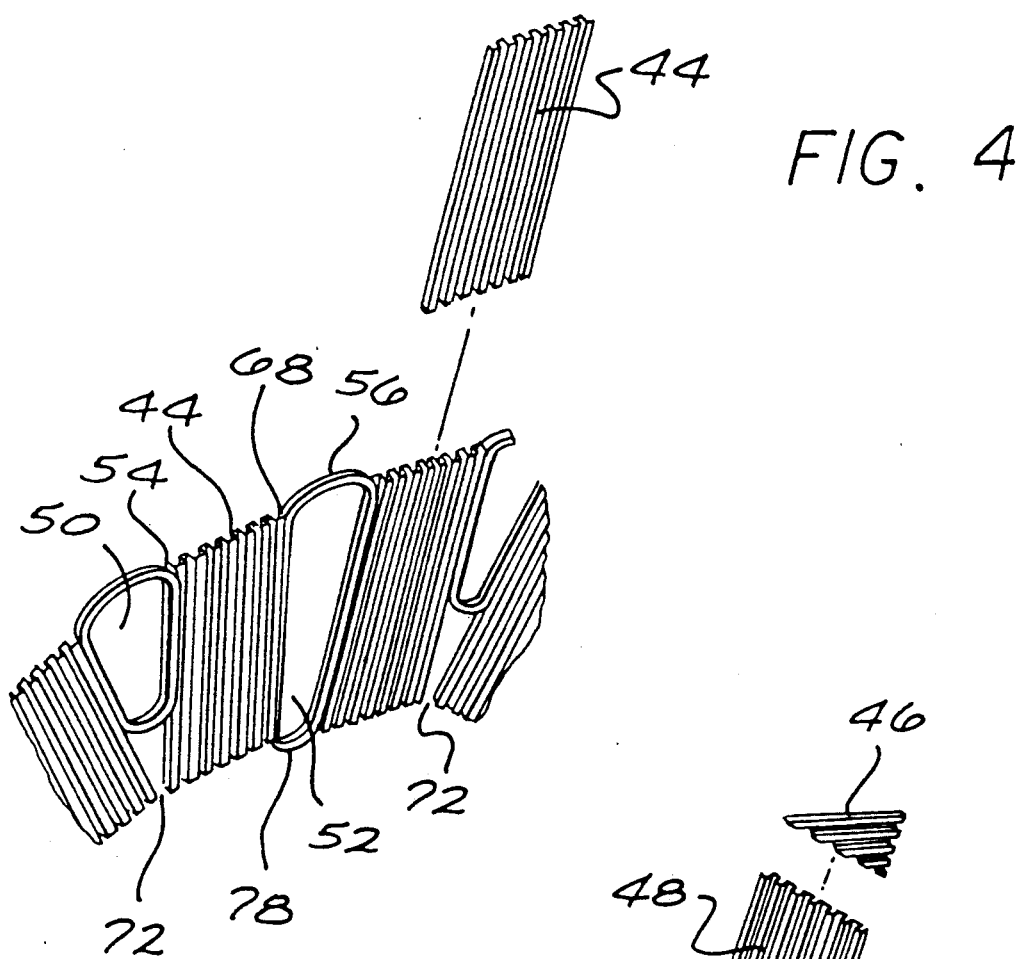
FIG. 4 shows an enlarged partial view of a gas passage from the portion of the recuperator core enclosed by circle 4 within FIG. 2.
Figure 5:
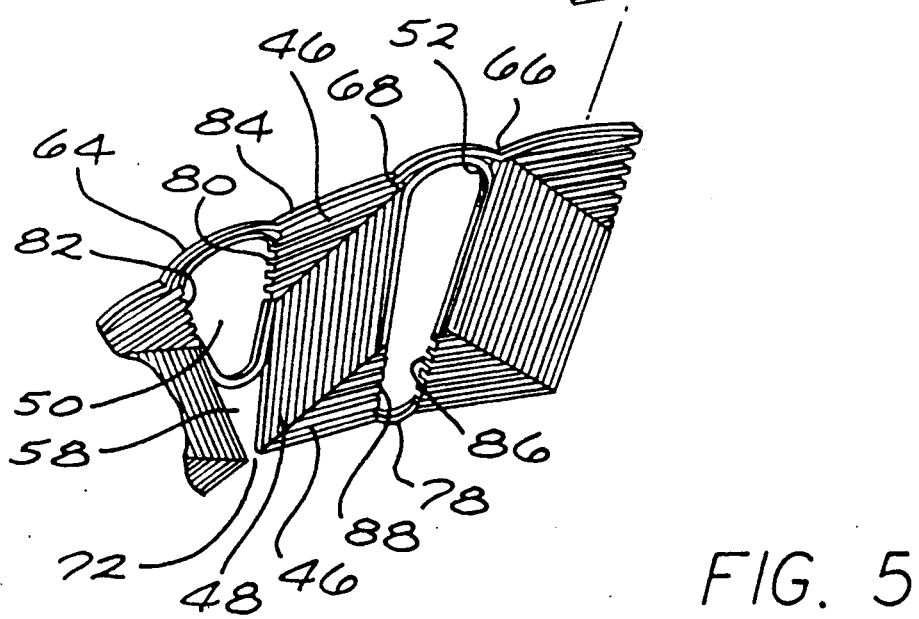
FIG. 5 shows an enlarged, partial view of an air passage from the portion of the recuperator core enclosed by circle 5 within FIG. 2.

FIGS. 2-5 depict more detailed views of the annular core 32 of the recuperator 10. FIG. 2 shows a perspective view of an assembled annular core 32, as well as a partially exploded schematic view of the major components of the annular core 32. The annular core 32 is constructed entirely from a plurality of five mass producible components. These components include generally disk shaped plates 40 (FIG. 3) generally rectangular exhaust passageway fin elements 44 (FIG. 4), triangular fin elements 46, and parallelogrammatical fin elements 48 (FIG. 5).

Each plate 40 includes a first plurality of generally triangularly shaped inlet passageways 50 alternately arranged in paired sets with a second plurality of generally triangularly shaped outlet passageways 52, formed therein. The edges of the inlet and outlet passageways 50, 52 are stamped to include border ridges 54, 56, respectfully, thereabout. The plates 40 also include generally triangularly shaped open spaces or voids 58, which may include border ridges 59 thereabout. The ridges 54, 56, 59 may extend a height equal to the spacing between adjacent plates 40 upon assembly, or a fraction thereof. Preferably, the ridges 54, 56, 59 extend a height equal to one half of the spacing between adjacent plates 40. When the plates 40 are assembled, the inlet passageways 50 align and define a plurality of compressed air inlet manifold 60. Similarly, the outlet passageways 52 align to define a plurality of air outlet manifolds 62. As may be readily appreciated, the heating of the air within the core 32 results in expansion of the air. Thus, the outlet passageways 52 and manifolds 62 have a larger cross sectional area then do the inlet passageways 50 and manifolds 60, to prevent excessive back pressurizing of the compressor section 14.

FIG. 3 shows a frontal view of an individual plate 40, including the inlet passageways 50, outlet passageways 52 and voids 58. The inlet passageways 50 are preferably formed in a shape approximating a trapezoid. A radially outer side 64 of the trapezoid is generally disposed adjacent the outer circumference of the annular core 32. Sides 66 and 68 of the trapezoid converge radially inward. The radially inward side 70 of the trapezoid is generally aligned perpendicular to a radius of the plate 40, and is preferably positioned approximately one-half of the distance between the radially inward and radially outer diameters of the plate 40. The generally triangularly shaped voids 58 are preferably disposed radially inward of the inlet passageways 50. The voids 50 are generally configured to have sides which converge radially inward. However, the voids 58 are configured to have a gap 72 which is in open communication with the annular chamber 30 within the annular core 32. Upon assembly of the annular core 32 the gaps 72 align and form slots which extend axially along the inner circumference of the annular core 2. The gaps 72 provide flexibility to accommodate the relative thermal growth at the internal circumference of the annular core 32 without incurring high thermal stresses in the plates 40. As indicated, the inlet passageways 50 are generally trapezoidally shaped. However, it is preferable that the vertices of the trapezoid are radiused, thereby allowing for thermal expansion and reducing stress concentrations. Similarly, for the voids 58, the corners proximate the inlet passageways 50 are also preferably radiused.

FIG. 4 shows a partial, exploded view of adjacent exhaust gas passageways 34 identified by circle 4 within FIG. 2. The exhaust gas passageways 34 are generally rectangularly shaped and imposed between adjacent inlet and outlet passageways 50, 52. A corrugated sheet of exhaust passageway fin elements 44 is inserted within the passageway 34, to turbulate the exhaust gas flow and promote heat transfer to the plates 4C. Ridges 54 and 56 prevent the exhaust gases from mixing with the air within the manifolds 60 and 62. Thus, the exhaust gases are constrained to flow radially out through the annular core 32 within the exhaust gas passageways 34, transferring heat to the exhaust passageway fin elements 44. Since the exhaust gas passageways 34 are generally rectangular in shape, the cross-sectional area through which the exhaust gases flow can be made essentially constant. Alternatively, since cooling of the exhaust gases occurs as they flow out through the core, the exhaust gas passageways 34 may be designed for constant pressure radial flow of the exhaust gases forming the passageways 34 and fin elements 44 in the shape of a trapezoid, the sides of which converge radially outward. This is readily accomplished by adjusting the shape of the adjacent inlet passageways 50, voids 58, and outlet passageway 52.

FIG. 5 shows a partial, exploded view of the compressed air flow path identified by circle 5 within FIG. 2. Compressed air flows axially into the annular core 32 through the inlet manifolds 60 defined by inlet passageways 50 within each disk plate 40. As described earlier, the outlet passageways 52 are generally triangularly shaped. Preferably however, all of the corners are radiused, thereby allowing for thermal expansion and reducing stress concentration. Two sides of the triangles 74 and 76 for the outlet passageways 52 converge radially inward toward the inner circumference of the annular core 32. The radially inward vertices of the triangles is also curvalinear, allowing thermal growth without stress induced failure.

Gaps or openings 80, 82 within the radially outer section of ridges 54 surrounding inlet passageways 50 allow the compressed air to enter a generally rectangular area 84 between adjacent inlet and outlet passageways 50 and 52. Rectangular areas 84 is oppositely disposed relative to the exhaust gas passageways 34, separated by the disk plates 40. A second set of openings 86, 88 within the radially inner portions of ridges 56 surrounding outlet passageways 52 also communicate with and receive compressed air from the rectangular areas 84.

In order to promote heat transfer to the compressed air, the parallelogrammatical fin elements 48 and a pair of triangular fin elements 46 are disposed within the rectangular areas 84. The fin elements 48 and 46 are arranged to provide a plurality of generally Z (or backward Z) shaped passages between the openings 80, 82 of inlet passageways 50 and openings 86, 88 of outlet passageways 52. The triangular fin elements 46 define the top and base of the Z and have fin corrugations which are generally circumferentially aligned, while the parallelogrammatically shaped fin elements 48 define the central portion of the Z, and have fin corrugations which are generally radially aligned.

The support rings 42 are configured to conform to the inner diameter of the disk plates 40, and include tabs or ears 43 which follow the contour of the inner surfaces of the voids 58. The support rings 42 are preferably formed from a material having a different coefficient of expansion than the material of the disk plates 40, thereby the support rings 42 can be selected to prestress the inner diameter of the disk plates 40.

To form a stainless steel annular core 32, blanks for the disk shaped plates 40 are cut from a first sheet of stainless steel. The blanks are then stamped to form the ridges 54, 56, 59 about the inlet and outlet passageways, as well as to displace the outer edge 68 and inner edge 78 of each plate 40 from the plane of the plate 40. The fin elements are all formed from a second sheet of stainless steel which is first corrugated as a sheet. Then the sheets are cut to the desired shapes, preferably by a laser or wire cutting operation. Each of the plates and fin elements may then be coated with a brazing compound prior to assembly. When the assembled core 32 is subsequently heated, the brazing compound interbonds all adjacent surfaces.

To form the pluralities of individual components into the annular core 32, the formed disk plates 40 are repetitively stacked to alternately sandwich the exhaust passageway fins and the air passageway fins 46, 48 between successive disk plates 40. Once a plurality of the disks 40 have been so arranged into a stacked array, the annular core 32 may be dipped in liquified brazing material, then brazed within a furnace to bond all adjacent surfaces, forming a metallurgically bonded, honey-comb like monolithic core structure, that is very strong, yet internally resilient. Air transition ducts 90, flanges 93, mount plate 94, and bladder 96 (FIG. 1) are welded to the core to form the complete recuperator. The resulting structure can accommodate large thermally induced temperature gradients, and provide long service life performance. Because of its high strength-to-weight ratio and the distribution of externally applied loads throughout the core 32, environmentally induced stresses resulting from vibration and shock are readily accommodated. The matrix also provides for the efficient transfer of heat from the hot gas to the colder compressor air.

Figure 6:
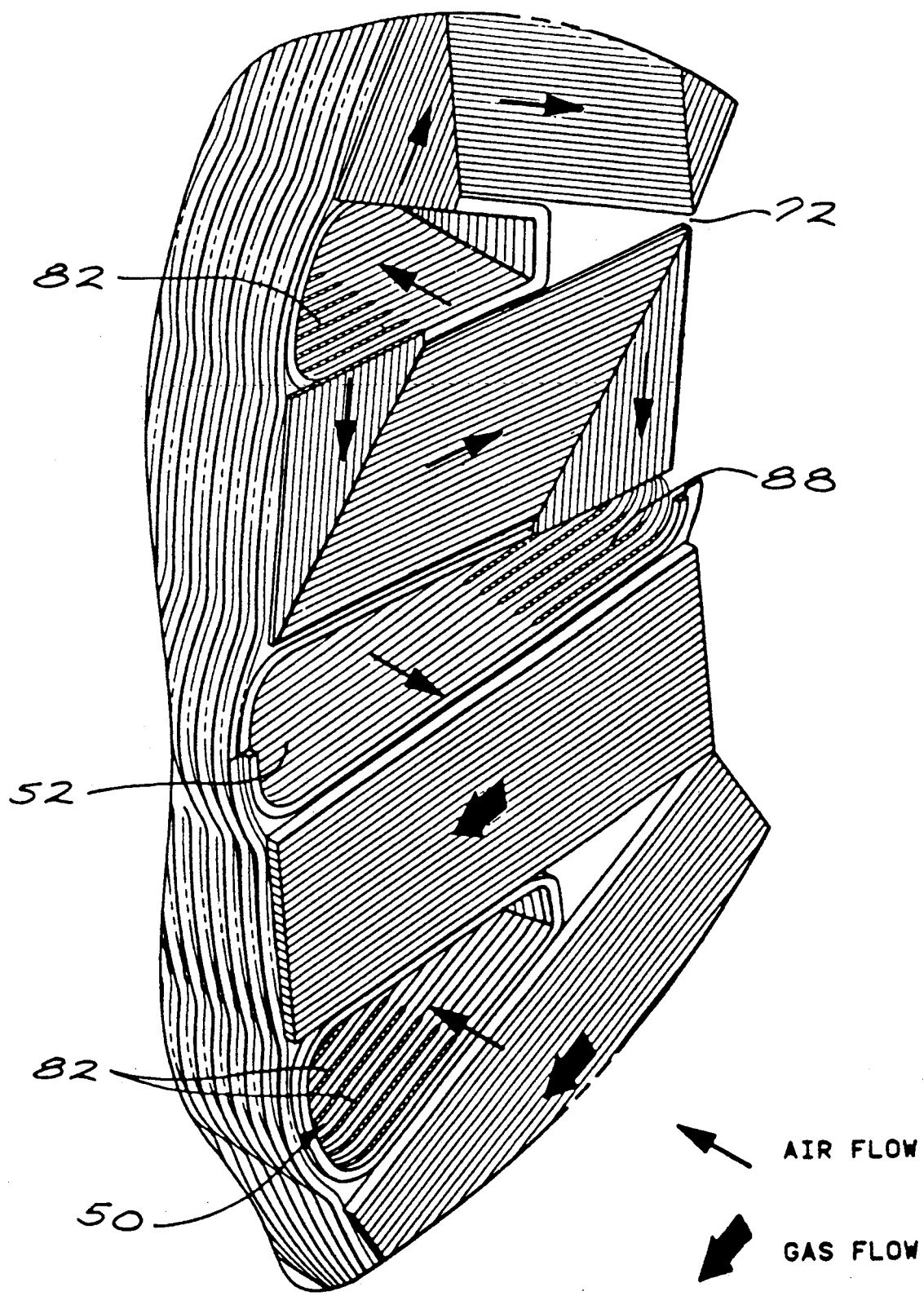
FIG. 6 shows an enlarged, partial perspective view of a portion of the recuperator core depicting the air and gas flow.

The compressed air and exhaust gas flow patterns are further illustrated in FIG. 6. Air flows axially (perpendicular to the plane of the paper) through each air inlet manifold 60, and then enters each individual rectangular area 84 through a triangular crossflow inlet end section. The air turns and flows axially inward through a counterflow section, turns into a triangular crossflow exit section, and exits into the air outlet manifold 62. Meanwhile, the exhaust gas flows radially outward straight through the exhaust gas passageways 32 on the opposite sides of the plates 40 from the air flow.

As may readily be appreciated, the inner circumference of the angular core 32 will be subjected to the highest temperatures. The annular configuration of the annular recuperator 30 inherently results in high compressive stress at the inner circumference due to the metal temperature gradients during both transient and steady operation. Since the combustion gases enter the annular core 32 at the internal diameter, the metal temperatures are hotter at the internal diameter than at the outer diameter of the annular core 32. This results in high thermal compressive stresses at the internal diameter, which, coupled with reduced material properties due to higher temperature levels, can result in stress cracking causing air leakage and loss of engine power. The incorporation of the gaps 72 which align to form the axial slots reduces the thermal stresses at the radially inward portions of the annular core 32 and specifically the plates 40.

Figure 7:
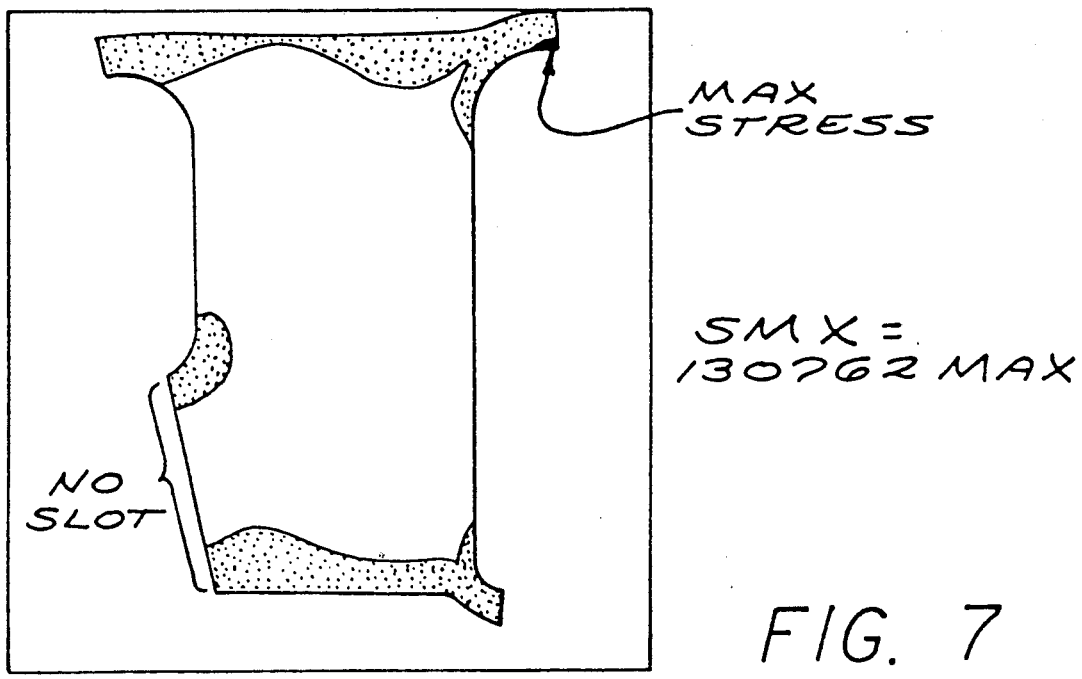
FIG. 7 and 8 depict stress concentrations within portions of the plates of the recuperator core.
Figure 8:
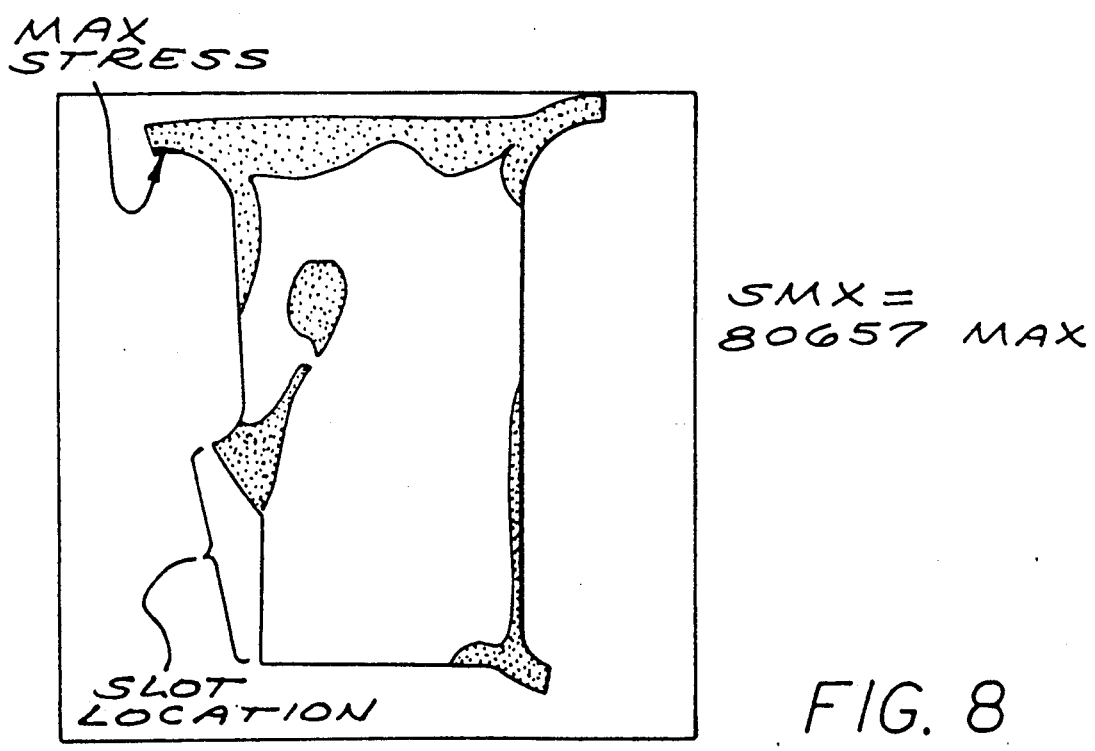

FIGS. 7 and 8 depict comparative thermal stress analysis plots for a portion of plate 40. In FIG. 7, the annular recuperator 10 is configured without the gaps 72. In FIG. 8, the annular core is configured with the annular slots 72. The stress plots depict computer modeling of the stresses induced by thermal expansion of the plates 40, for similar test parameters of inlet temperature, outlet temperature, and projected flow rates. The maximum stress which occurs in the plate 40 which does not include the gaps 72 (FIG. 7) at the radially inward edge is equal to 130 ksi. By comparison, the maximum stress for the plates 40 which incorporate the slot 72 (FIG. 8), for the same set of test parameters is 80 ksi. Thus, the incorporation of the slots 72 results in an approximately 40 percent decrease in the maximum stress incurred by the thermal expansion within the plates 40. This significant reduction in the maximum stress values will benefit the reliability of the annular recuperator 10 irrespective of the material used in the construction.

The recuperator material is preferably 14-percent chromium, 4-percent molydenum (14Cr-4Mo) stainless steel, brazed with a nickel chromium alloy. Alternatively, the recuperator may be formed from ceramics such as silicon nitride or silicon carbide, which would be similarly formed into the desired shapes while in a green state, assembled into a core stack, and sintered to form a monolithic ceramic annular core 12.

We claim:

1. An annular recuperator core for use with a combustion power plant which utilizes a flow of ambient air and produces a flow of hot exhaust gas, said annular core comprising:

a stacked plurality of generally disk shaped plates enclosing an annular chamber, each of said plates including a plurality of generally trapezoidally shaped inlet passageways and a plurality of voids disposed radially inward of said inlet passageways, said voids communicating with said annular chamber through gaps in an inner diameter of said disk shaped plates, said inlet passageways and voids alternately arranged in paired sets with a plurality of generally triangularly shaped outlet passageways; each of said passageways bordered at least partially by ridges extending a height of between the spacing between adjacent plates and a fractional portion thereof;

a plurality of exhaust passageways disposed between alternate pairs of said stacked plurality of plates within the spaces defined by said paired adjacent inlet and outlet passageways;

a plurality of enclosed passageways alternately stacked with respect to said exhaust passageways between alternate pairs of said stacked plurality of plates;

a first plurality of openings within said ridges bordering said inlet passageways of said plates, said first openings communicating with said enclosed passageways between alternate pairs of said stacked plurality of plates to distribute air thereto; and a second plurality of openings within said ridges bordering said outlet passageways of said plates, said second openings communicating with said enclosed passageways between alternate pairs of said stacked plurality of plates to receive heated air therefrom.

2. The annular recuperator of claim 1 wherein said plurality of inlet passageways within said plurality of plates are aligned to define inlet manifolds and said plurality of outlet passageways align to define a plurality of outlet manifolds, said inlet and said outlet manifolds thereby being axially aligned within said annular core.

3. The annular recuperator of claim 2 wherein said generally triangular inlet and outlet passageways and said voids have radiused corners.

4. The annular recuperator of claim 1 wherein said core section further comprises:

a plurality of support rings assembled into the annular core at the inner diameter of said disk plates, said support rings including tabs conforming to the inner surface at said voids.

5. The annular recuperator of claim 4 wherein said support rings within said core section are formed from a material having a different thermal coefficient of expansion than the material of said disk plates, and said support rings pre-stress the inner diameter of said disk plates.

6. The annular recuperator of claim 5 wherein said plates and said support rings are assembled and interbonded to form a solid monolithic annular core.

7. The annular recuperator of claim 1 wherein said voids are generally triangularly shaped having one side proximately abutting an inner side of said inlet passageways, and the remaining two sides of said voids converging radially inward without intersecting, thereby forming said gaps opening to said annular chamber within said annular core.

8. The annular recuperator of claim 7 wherein said core section further comprises:

a plurality of support rings assembled into the annular core at the inner diameter of said disk plates, said support rings including tabs conforming to the inner surface at said voids.

9. The annular recuperator of claim 7 further comprising:

a plurality of corrugated fin elements disposed within said plurality of exhaust passageways; and a second plurality of generally Z shaped fin elements disposed within said enclosed passageways.

10. The annular recuperator of claim 1 wherein said plates are formed stainless steel sheets and said formed stainless steel sheets are brazed together with a nickel chromium alloy.

* * * * *